United States Patent Office 3,017,939
Patented Jan. 23, 1962

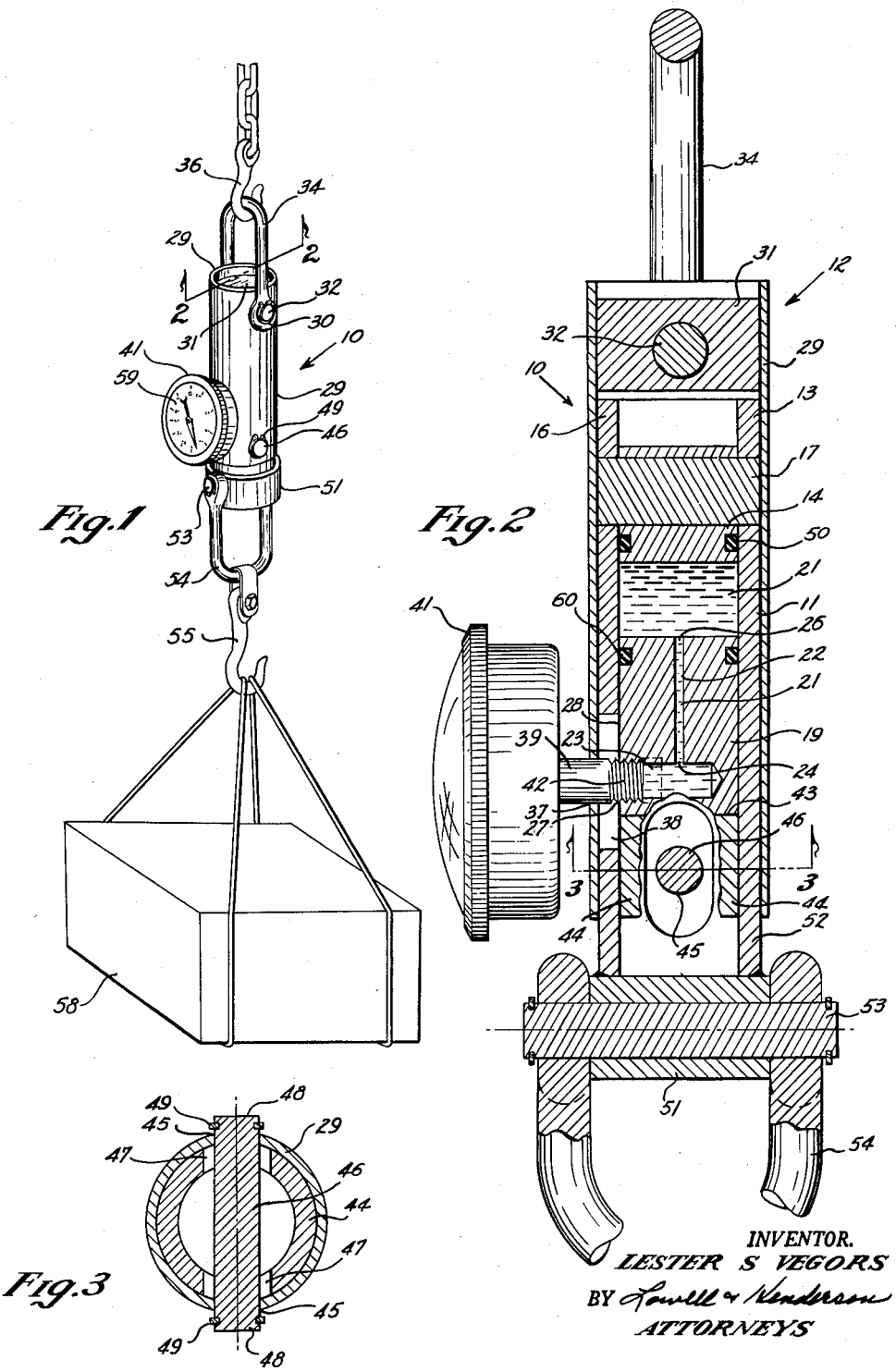

3,017,939
FLUID PRESSURE MEASURING DEVICE
Lester S. Vegors, 2107 Country Club Blvd., Ames, Iowa
Filed Feb. 23, 1960, Ser. No. 10,181
3 Claims. (Cl. 177—208)

This invention relates generally to a fluid pressure measuring or indicating device and in particular to a device of this type adapted to be connected between a first member on which a load is to be applied, and a second member which applies the load, for the purpose of indicating the load applied on the first member by the second member.

An object of this invention is to provide an improved fluid measuring device for indicating the load or pull applied on one body member by a second load-exerting body member.

A further object of this invention is to provide a fluid measuring device of such type which is of a simple and economical construction and capable of accurately measuring an applied load over a wide load range, whether used as a scale in a simple weighing operation, or as a dynamometer to measure the pull load between a tractor and a trailer or farm implement.

Further objects, features and advantages of this invention will appear from the following description when considered in connection with the accompanying drawing, wherein;

FIG. 1 is a perspective view of the fluid pressure measuring device of this invention showing its use in a weighing operation;

FIG. 2 is an enlarged longitudinal sectional view through the device taken along line 2—2 in FIG. 1 with some parts broken away to more clearly show its construction; and FIG. 3 is a sectional view taken along the line 3—3 of FIG. 2.

With reference to the drawings the pressure measuring device of this invention is indicated generally as 10 in FIGS. 1 and 2, and includes a cylinder assembly 11 and a sleeve assembly 12.

The cylinder assembly 11 includes a cylinder 13 having a piston 14 adjacent its end 16, with the piston 14 being fixed relative to the cylinder 13 by a pin 17 extended transversely of the piston 14 and extended through the cylinder 13 with its ends terminating within the transverse dimension of the cylinder. A piston 19, movable relative to the cylinder 13, is spaced from the fixed piston 14 so as to form a fluid chamber 21 within the cylinder 13 between the adjacent ends of the pistons 14 and 19. The movable piston 19 is formed with a fluid passage 21 having a longitudinal section 22 and a transverse section 23, with the longitudinal section 22 being of a reduced diameter relative to the transverse section 23. As indicated at 24, in FIG. 2, the inner ends of the passage sections 22 and 23 are in fluid registration, with the outer end 26 of the section 22 being open to the fluid chamber 21, and with the outer end 27 of the transverse section 23 being open to the side wall 28 of the movable piston 19.

The sleeve assembly 12 (FIG. 2) includes a tubular sleeve member 29 for slidably receiving therein the cylinder 13. Arranged within the sleeve member 29 at a position adjacent the cylinder end 16 is a circular plug member 31. A pin 32 is extended transversely through the plug member 31 and the sleeve member 29 so that its opposite ends project outwardly from the sleeve member. Secured to the projected ends of the pin 32 is a U-shape connecting member 34 adapted for connection with a chain hook or the like 36, as shown in FIG. 1. Usual spring washers or clips 30 retain the pin 32 against axial movement.

Opposite from, and in alignment with the outer end 27 of the transverse passage 23 (FIG. 2), the sleeve member 29 is formed with an opening 37 and the cylinder 13 with an elongated opening 38. A stem or fluid connector 39 of a pressure indicating device 41 is inserted through the openings 37 and 38 for threadable engagement with the passage end 27 as indicated at 42, so that the indicating device 41, sleeve member 29 and piston 19 are movable as a unit longitudinally of the cylinder 13.

Positioned against the outer end 43 of the movable piston 19 is a circular plug member 44 which constitutes an extension of the movable piston 19 (FIG. 3). A pin 46 is inserted transversely through the plug member 44, through elongated openings 47 formed in the cylinder 13 and through mating circular openings 45 in the sleeve member 29 so that the opposite ends 48 thereof project outwardly from the sleeve member. Usual spring washers or clips 49 positioned on the projected ends 48 of the pin 46 maintain the pin 46 against axial movement. By virtue of this assembly of the pin 46 with the plug member 44, cylinder 13 and sleeve member 29, the movable piston 19 and sleeve member 29 are connected together as a unit for longitudinal movement relative to the cylinder 13.

A circular plug member 51 secured to the cylinder end 52, as by welding or the like, has inserted therethrough a connecting pin 53 which carries a loop shape connecting member 54 adapted for connection with a hook or the like 55 as illustrated in FIG. 1.

In the use of the fluid pressure measuring device 10 in a weighing operation, the device at the connecting member 34 is suspended from the hook 36, as illustrated in FIG. 1, and the object or load 58 to be weighed is suspended at the hook 55 from the connecting member 54. With the load 58 thus suspended the fixed piston 14, which functions as a closure for the cylinder end 16, tends to move downwardly, as a unit, with the cylinder 13 whereby to compress the fluid, usually oil, within the chamber 21 and passage 22 by virtue of the piston 19 being fixed with the sleeve member 29. The fluid pressure resulting from this compression action is transmitted through the passage 21 to the gauge 41 so as to indicate visually the pull or pressure applied on the connecting member 54 by the load 58. It will be appreciated that the scale 59 of the gauge 41 can be calibrated to give directly in pounds the measure of the total load.

Where the device is to be used as a dynamometer or pull meter to measure the load applied by a tractor unit on a trailer or farm implement, the connecting member 34 is merely attached to the tractor and the member 54 is connected to the trailer or farm implement so that the device 10 constitutes a hitch connection between the tractor and trailer. On forward movement of the tractor the load or pull applied to the trailer is directly indicated on the gauge 41, the operation of the device being the same as above described relative to its use as a weighing scale.

To prevent fluid or oil leakage from the chamber 21 the adjacent ends of the pistons 14 and 19 are provided with usual O-rings 50 and 60, respectively. However, should any leakage of oil from the chamber 21 take place the accuracy of the device 10 to measure the fluid pressure resulting from a pull in opposite directions on the connecting members 34 and 54, is not impaired by virtue of the lost motion connections of the cylinder 13 with the piston 19 and sleeve member 29 at the fluid connector 39 and pin 46, respectively.

Although the invention has been described and illustrated with respect to a preferred embodiment thereof it is to be understood that it is not to be so limited since changes and modifications can be made therein within the

I claim:

1. A fluid pressure measuring device adapted to be connected between a first member, on which a load is to be applied, and a second member which applies the load, to measure the load applied on said first member by said second member, said device comprising a cylinder closed at one end, a piston for said cylinder forming with said closed end a fluid chamber in said cylinder, a tubular sleeve for slidably receiving said cylinder therein, transverse means inserted through said sleeve and piston and loosely through said cylinder to provide for the longitudinal movement of said piston and sleeve as a unit relative to said cylinder, said piston being formed with a fluid passage having one end open to said fluid chamber and the other end terminating in the side surface of said piston, said sleeve and cylinder having openings therein aligned with said other end of the fluid passage, with the opening in said cylinder being elongated longitudinally of the cylinder, a pressure indicating gauge having a fluid connection extended through said openings and connected with the other end of said fluid passage, means on said sleeve adjacent the closed end of said cylinder connectible with said first member, and means on the end of said cylinder remote from the closed end thereof connectible with said second member.

2. A fluid pressure measuring device adapted to be connected between a first member on which a load is to be applied, and a second member which applies the load, to measure the load applied on said first member by said second member, said device including a cylinder having a fixed piston adjacent one end and a movable piston spaced from said fixed piston to form a fluid chamber within said cylinder, said movable piston being formed with a fluid passage having one end open to said fluid chamber and the opposite end open to the side surface of said movable piston, a sleeve member for slidably receiving said cylinder therein, said sleeve member and cylinder having openings therein opposite the other end of said fluid passage, with the opening in said cylinder being elongated longitudinally of the cylinder, a pressure indicating gauge having a fluid connection inserted through said openings for fluid connection with the other end of said fluid passage, a lost motion connection between said cylinder and said movable piston having a portion secured to said sleeve member to provide for longitudinal movement of said movable piston and sleeve member as a unit relative to said cylinder, connecting means on said sleeve member adjacent said one end of the cylinder connectible with said first member, and other connecting means on the opposite end of said cylinder connected with said second member.

3. A fluid pressure measuring device adapted to be connected between a first member on which a load is to be applied, and a second member which applies the load, to measure the load applied on said first member by said second member, said device including a cylinder having a fixed piston adjacent one end and a movable piston spaced from said fixed piston to form a fluid chamber within said cylinder, said movable piston being formed with a fluid passage having one end open to said fluid chamber and the opposite end open to the side surface of said movable piston, a sleeve member for slidably receiving said cylinder therein, said sleeve member and cylinder having aligned openings therein opposite the other end of said fluid passage, with the opening in said cylinder being elongated longitudinally of the cylinder, a pressure indicating gauge having a fluid connection positioned within said openings for fluid connection with the other end of said fluid passage, said movable piston and said sleeve member having a set of second aligned openings formed therein, said cylinder having a second opening elongated longitudinally thereof, a transverse member inserted through said second aligned openings and said second elongated opening, whereby said movable piston and said sleeve member are movable as a unit relative to said cylinder, connecting means on said sleeve member adjacent said one end of the cylinder connectable with said first member, and other connecting means on the opposite end of said cylinder connected with said second member.

References Cited in the file of this patent
UNITED STATES PATENTS

| | | |
|---|---|---|
| 2,380,362 | Hem | July 10, 1945 |
| 2,640,353 | Hefner | June 2, 1953 |